United States Patent
Kim et al.

(10) Patent No.: US 10,274,163 B2
(45) Date of Patent: Apr. 30, 2019

(54) BACKLIGHT UNIT AND DISPLAY DEVICE COMPRISING SAME

(71) Applicant: LG ELECTRONICS INC., Seoul (KR)

(72) Inventors: Mangeun Kim, Seoul (KR); Sangcheon Kim, Seoul (KR); Taegu Kang, Seoul (KR); Seongman Jeon, Seoul (KR); Hyunho Lee, Seoul (KR); Kyoungwoo Jo, Seoul (KR); Yongjin Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/039,309

(22) PCT Filed: Dec. 27, 2013

(86) PCT No.: PCT/KR2013/012304
§ 371 (c)(1),
(2) Date: May 25, 2016

(87) PCT Pub. No.: WO2015/083880
PCT Pub. Date: Jun. 11, 2015

(65) Prior Publication Data
US 2017/0045199 A1 Feb. 16, 2017

(30) Foreign Application Priority Data
Dec. 3, 2013 (KR) .................. 10-2013-0149405

(51) Int. Cl.
*H01L 23/373* (2006.01)
*F21V 7/05* (2006.01)
*G02F 1/1335* (2006.01)
*F21V 7/22* (2018.01)
*F21Y 115/10* (2016.01)

(52) U.S. Cl.
CPC .............. *F21V 7/05* (2013.01); *F21V 7/22* (2013.01); *G02F 1/133605* (2013.01); *G02F 1/133608* (2013.01); *F21Y 2115/10* (2016.08)

(58) Field of Classification Search
USPC ........................................... 362/97
See application file for complete search history.

(56) References Cited

U.S. PATENT DOCUMENTS

| | | | |
|---|---|---|---|
| 2006/0028842 A1 | 2/2006 | Kim et al. | |
| 2007/0236929 A1 | 10/2007 | Hung et al. | |
| 2008/0062542 A1* | 3/2008 | Kogure | B32B 27/08 |
| | | | 359/838 |

(Continued)

FOREIGN PATENT DOCUMENTS

| CN | 101377589 A | 3/2009 |
|---|---|---|
| CN | 100520525 C | 7/2009 |

(Continued)

*Primary Examiner* — Matthew Mikels
(74) *Attorney, Agent, or Firm* — Birch, Stewart, Kolasch & Birch, LLP

(57) ABSTRACT

Disclosed is a backlight unit comprising: a reflecting plate having a light source seated thereon; a first metal pattern formed on one surface of the reflecting plate so as to make contact with the light source; and a second metal pattern formed on the other surface of the reflecting plate and electrically connected to the first metal pattern.

2 Claims, 9 Drawing Sheets

(56) References Cited

U.S. PATENT DOCUMENTS

| | | | | |
|---|---|---|---|---|
| 2008/0079865 A1* | 4/2008 | Kang | ............... | F21V 19/009 349/61 |
| 2012/0224108 A1* | 9/2012 | Obata | ............... | B32B 37/185 348/739 |
| 2014/0192557 A1* | 7/2014 | Lu | ............... | G09F 13/14 362/612 |

FOREIGN PATENT DOCUMENTS

| | | |
|---|---|---|
| CN | 101983436 A | 3/2011 |
| CN | 202091952 U | 12/2011 |
| CN | 102449376 A | 5/2012 |
| CN | 202216031 U | 5/2012 |
| CN | 202371498 U | 8/2012 |
| CN | 102853337 A | 1/2013 |
| KR | 10-2012-0046454 A | 5/2012 |
| KR | 10-2013-0007263 A | 1/2013 |
| KR | 10-2013-0124651 A | 11/2013 |

\* cited by examiner

BACKLIGHT UNIT AND DISPLAY DEVICE COMPRISING SAME

CROSS REFERENCE TO RELATED APPLICATIONS

This application is the National Phase of PCT International Application No. PCT/KR2013/012304, filed on Dec. 27, 2013, which claims priority under 35 U.S.C. 119(a) to Patent Application No. 10-2013-0149405, filed in the Republic of Korea on Dec. 3, 2013, all of which are hereby expressly incorporated by reference into the present application.

TECHNICAL FIELD

The present disclosure relates to a backlight unit having a reduced thickness.

BACKGROUND ART

Display devices include both a device for recording and playing an image and a device for recording and playing audio. The device for recording and playing an image includes a TV, a monitor, a projector, and the like.

As functions of display devices become more diversified, display devices can support more complicated functions such as capturing images or video, reproducing music or video files, playing games, receiving broadcast signals, and the like. By comprehensively and collectively implementing such functions, display devices are embodied in the form of multimedia players or devices.

In order to support and increase functions of display devices, various attempts have been made in terms of hardware or software. Attempts corresponding to hardware part include structural modifications and improvements improving appearance of display devices.

The structural modifications and improvements include a scheme of improving a structure of a backlight unit used in a display.

FIG. 1 illustrates a backlight unit used in a related art display. The related art display uses a printed circuit board (PCB) 20 on which a light source 10 is mounted, as a backlight unit. The PCB 20 has a structure in which an insulator is used as a core and a metal is deposited on a surface thereof. A photo imageable solder resistor (PSR) coated on the PCB 20 has low reflectivity, and thus, in order to increase efficiency of a system, a reflecting plate 30 is required to be attached to the PCB.

A thickness d1 of the PCB 20 is generally greater than a thickness d2 of the reflecting plate 30. In order to attach the reflecting plate 30 to the PCB 20 on which the light source 10 is mounted, a hole allowing the light source 10 to be inserted thereinto is required to be formed, and in order to fix the reflecting plate 30, an adhesive tape 40 is additionally attached.

Recently, research has conducted to increase competitiveness by reducing manufacturing cost of a backlight unit and meet consumer demand for design by reducing a thickness of a display device.

SUMMARY OF THE INVENTION

An aspect of the present disclosure provides a backlight unit having a small thickness by removing a PCB for installation of a light source.

Another aspect of the present disclosure is to provide a display device having enhanced performance by improving a light reflecting structure of a backlight unit.

According to an aspect of the present disclosure, a backlight unit includes: a reflecting plate on which a light source is mounted; a first metal pattern formed on one surface of the reflecting plate such that the first metal pattern is in contact with the light source; and a second metal pattern formed on the other surface of the reflecting plate and electrically connected to the first metal pattern.

In an example related to the present disclosure, the reflecting plate may be formed of a foamed polyethylene terephthalate (PET) material.

In an example related to the present disclosure, the reflecting plate may be formed of filler-inserted PET.

In an example related to the present disclosure, the reflecting plate may be formed by alternately laminating a layer having a relatively high refractive index and a layer having a relatively low refractive index.

In an example related to the present disclosure, the reflecting plate may have a first region on which the light source is seated and a second region bent to extend from one end of the first region toward the one surface thereof.

In an example related to the present disclosure, the second region may be formed to form an inclined plane.

In an example related to the present disclosure, the second region may be formed to form a curved surface.

In an example related to the present disclosure, the second region may include a first part bent to extend from one end of the first region, a second part bent to extend from one end of the first part, and a third part bent to extend from one end of the second part.

In an example related to the present disclosure, the reflecting plate may be formed as a transparent film, and the first and second metal patterns may be formed as transparent electrodes.

In an example related to the present disclosure, the light source may overlap the reflecting plate and emit light to both sides.

According to another aspect of the present disclosure, a display device may include: a housing; a display panel mounted on one surface of the housing and configured to display an image; and a backlight unit installed within the housing and configured to project light onto the display panel, wherein the backlight unit includes: a reflecting plate on which a light source is seated; a first metal pattern formed on one surface of the reflecting plate such that the first metal pattern is in contact with the light source; and a second metal pattern formed on the other surface of the reflecting plate and electrically connected to the first metal pattern.

In an example related to the present disclosure, the reflecting plate may have a first region on which the light source is mounted and a second region bent to extend from one end of the first region.

In an example related to the present disclosure, the first region may be attached to overlap one surface of the housing, and the second region may overlap a rear surface of the housing.

In an example related to the present disclosure, the second region may be formed to become distant from the rear surface as the second region becomes distant from the first region.

In an example related to the present disclosure, a light guide plate may be disposed between the reflecting plate and the display panel.

In an example related to the present disclosure, the display device may further include: a third region bent to extend from one end of the second region and configured to allow a light source to be seated thereon.

In an example related to the present disclosure, the first region may be disposed to overlap one surface of the housing, the second region may be disposed to overlap a rear surface of the housing, and the third region may be disposed to overlap the other surface of the housing.

In an example related to the present disclosure, a central portion of the second region may protrude.

The backlight unit related to at least one embodiment of the present disclosure configured as described above may have a thickness significantly smaller than that of an existing backlight unit, by using a reflecting plate in the place of a PCB. Thus, an internal space of a display device may be effectively utilized and the display device may be reduced in thickness.

Also, according to the structure of the present disclosure, since there is no need to attach a reflecting plate to a PCB, a manufacturing process of a backlight may be simplified and material cost may be reduced.

Also, according to the structure of the present disclosure, since a light source is in contact with a reflecting plate and the reflecting plate is bent to effectively reflect light, an amount of light leaked to outside of a device may be reduced and efficiency of the device may be maximized.

DETAILED DESCRIPTION OF EMBODIMENTS OF THE INVENTION

Figure 1:
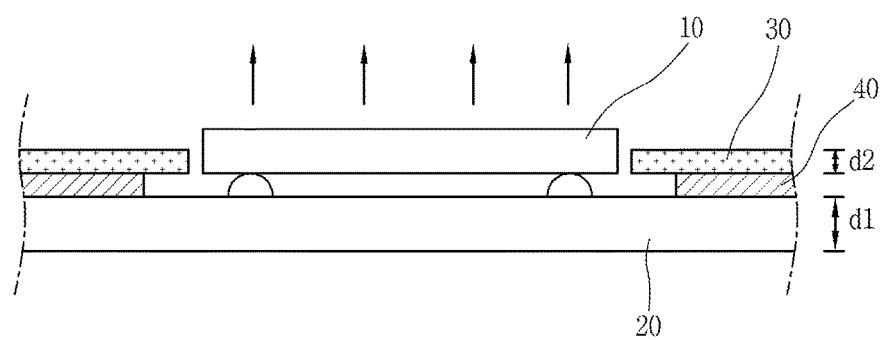
FIG. 1 is a conceptual view illustrating a structure of a related art backlight unit.

Hereinafter, embodiments will be described in detail with reference to the accompanying tables and drawings such that they can be easily practiced by those skilled in the art to which the present disclosure pertains. As those skilled in the art would realize, the described embodiments may be modified in various different ways, all without departing from the spirit or scope of the present disclosure. In the accompanying drawings, a portion irrelevant to description of the present disclosure will be omitted for clarity. Like reference numerals refer to like elements throughout.

In describing the present disclosure, it will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

Figure 2:
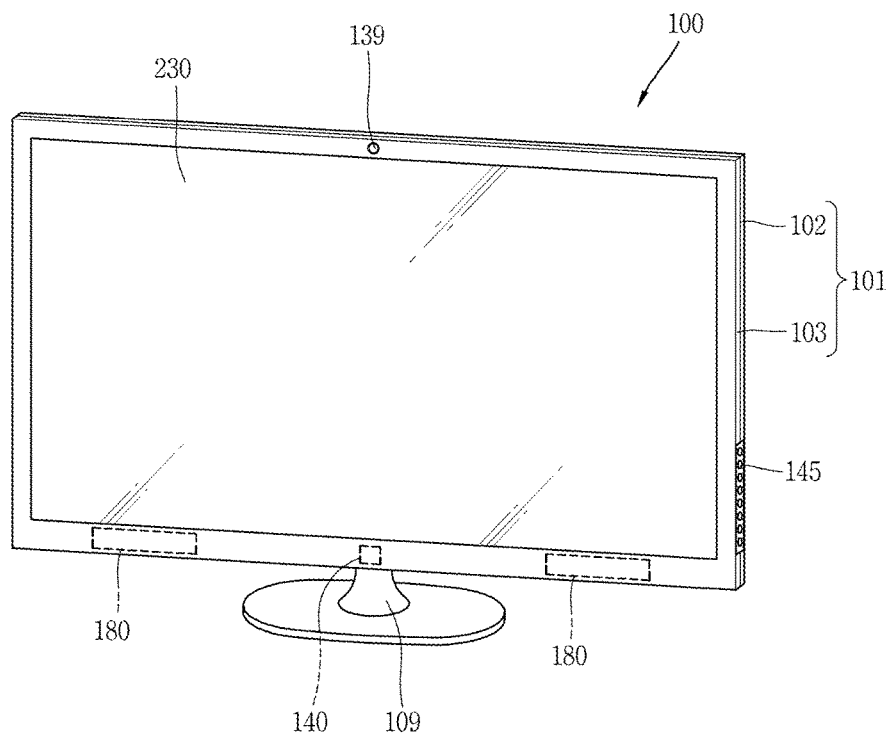
FIG. 2 is a front perspective view of a display device related to an embodiment of the present disclosure.

FIG. 2 is a front perspective view of a display device related to an embodiment of the present disclosure.

A display device 100 related to an embodiment of the present disclosure includes a main body forming an appearance. A housing 101 forming an appearance of the main body may be formed by a front case 102 and a rear case 103. Various electronic components may be installed in a space formed between the front case 102 and the rear case 103.

The main body may be may be fixed on the ground by a support 109.

The cases may be formed by injection-molding a synthetic resin or may be formed to have a metal, for example, stainless steel (STS) or titanium (Ti).

A display unit 230 may be disposed on the front case 102. The display unit 230 may be formed to occupy most of a main surface (front surface) of the display device 100.

The front case 102 may have a rectangular band shape with a predetermined width, or may have a rectangular plate shape covering the entirety of the front surface of the display unit 230. In the former case, the front case 102 may prevent damage to the edge portion of the front surface of the display unit 230 from external force, as well as shielding the edge on which an image is not output. In the latter case, the front case 102 may be a plastic panel or compressed tempered glass formed by injection-molding a resin through an injection compression molding technique. An opaque film layer or a coating layer may be formed on the edges of the front case to cover the edges of the display unit 230 to which light is not emitted.

A signal input/output unit, an audio output unit 180, or an interface unit 140 may be formed on the front case 102 of the rear case 103. The signal input/output unit, the audio output unit 180, or the interface unit 140 may each be formed in plurality. Here, any one of the plurality of signal input/output units, the plurality of audio output units 180, and the plurality of interface units 140 may be formed on the front case 102, and the other may be formed on the rear case 103.

An imaging unit 139 may be formed in the main body. The imaging unit 139 may be installed in the main body rotatably or in a pop-up manner. The imaging unit 139 processes an image frame such as a still image or a video obtained by an image sensor in an image communication mode or an image capture mode. The processed image frame may be displayed on the display unit 230. Also, the processed image frame may be stored in a storage unit or may be transmitted outwardly through the signal input/output unit 130. Two or more imaging units 139 may be provided according to a usage environment.

Image information of a user may be obtained through the imaging unit 139, and the imaging unit 139 may constitute an image communication unit together with a microphone.

A user input unit 145 may be formed on any one surface of the main body. The user input unit 145, operated to receive a command for controlling an operation of the display device 100, may include a plurality of manipulation units. The manipulation units may also be referred to as manipulating portions, and any type of manipulation units may be employed as long as the manipulation units are operated by a user in a tactile manner. The manipulation units may include, for example, a power key, a channel key, a volume key, and a setting key.

The display device described in this disclosure may also be applied to a mobile terminal such as a smartphone, a laptop computer, a digital broadcasting terminal, a personal digital assistant (PDA), a portable multimedia player (PMP), a navigation device, and the like, and a stationary terminal such as a digital TV, a desktop computer, and the like. That is, the present disclosure may be applied to any electronic device having a display unit.

Hereinafter, a configuration of the characteristics of the present disclosure will be described in detail.

Figure 3:
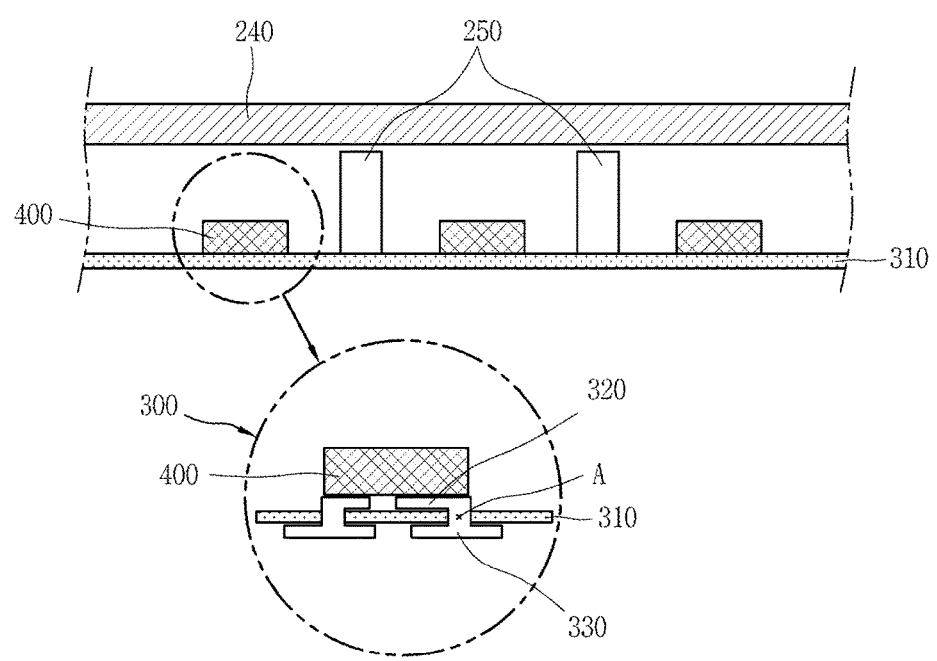
FIG. 3 is a conceptual view of a backlight unit related to an embodiment of the present disclosure.

FIG. 3 is a conceptual view of a backlight unit 300 related to an embodiment of the present disclosure.

In this disclosure, a direct type backlight unit 300 is illustrated. As illustrated, in the backlight unit 300, a plurality of light sources 400 are disposed to be spaced apart from one another at a predetermined interval.

Referring to FIG. 3, the backlight unit 300 may include a light source 400, a reflecting plate 310 on which the light source 400 is seated, and a first metal pattern 320 formed on one surface of the reflecting plate 310 and a second metal pattern 330 formed on the other surface of the reflecting plate 310.

The light source 400 may be an LED package or a thin plate-type surface light source.

The reflecting plate 310 reflects light irradiated from the light source 400 to enhance efficiency of the backlight unit 300. Also, in this disclosure, a structure in which the light source 400 is mounted on the reflecting plate 310, rather than being mounted on a PCB, whereby a thickness of the backlight unit 300 may be reduced and reflecting efficiency may be enhanced.

In the related art, a PCB has a structure in which an insulator is used as a core and a metal is deposited on a surface thereof, and here, a photo imageable solder resist (PSR) coated on the PCB has low reflectivity, and thus, the reflecting plate 310 needs to be attached to the PCB in order to enhance efficiency of a system.

Figure 4A:
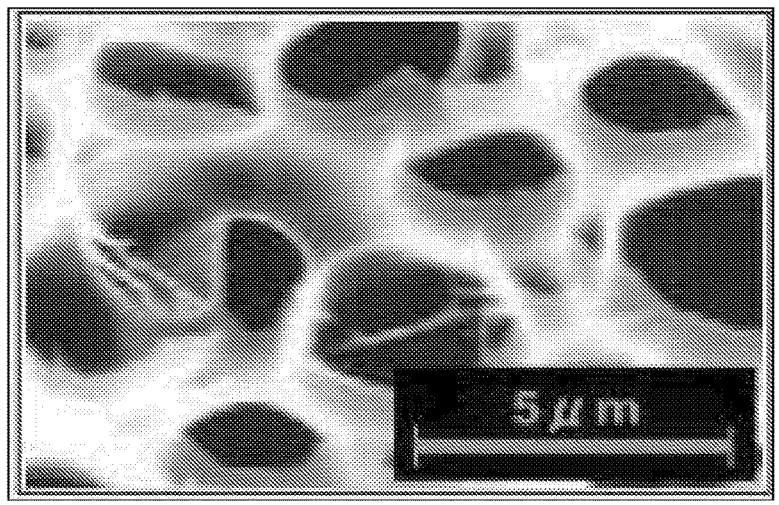
FIGS. 4A through 4C are views illustrating a structure of a reflecting plate of the present disclosure.
Figure 4B:
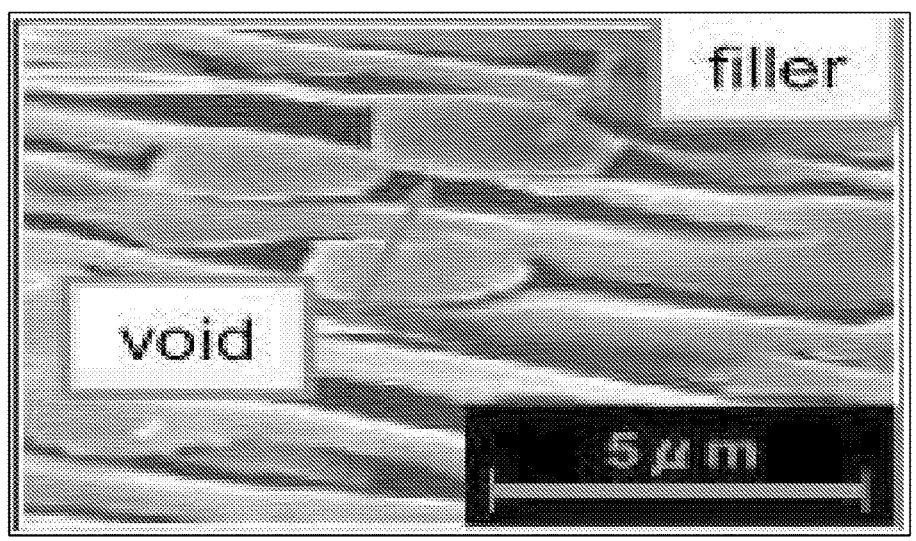
Figure 4C:
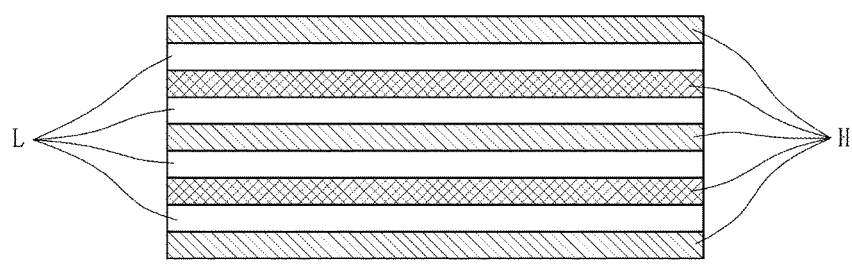

A manufacturing method and a structure of the reflecting plate 310 is different from those of a PCB, so the reflecting plate 310 has high reflectivity of light. FIGS. 4A through 4C are views illustrating a structure of the reflecting plate 310 of the present disclosure.

Referring to FIG. 4A, the reflecting plate 310 may be formed of a MCPET (microcellular reflective sheet) having foams of micrometer size ranging from 0.1 to 10 μm. The MCPET has high light reflectivity and workability, and thus, it is easily applied to the present disclosure. Also, the reflecting plate 310 may be a white reflecting plate manufacturing by inserting a filler (FIG. 4B) or may be a reflecting plate formed by alternately laminating a layer H having a relatively high refractive index and a layer L having a relatively low refractive index (FIG. 4C). Also, although not shown, the reflecting plate 310 may be formed by laminating a base member to the layers of FIG. 4C.

Referring back to FIG. 3, the light source 400 is seated on the reflecting plate 310. In detail, a first metal pattern 320 is formed on one surface of the reflecting plate 310, and the light source 400 is formed such that one surface thereof is in contact with the first metal pattern 320. A power supply terminal is formed on one surface of the light source 400.

A second metal pattern 330 is formed on the other surface of the reflecting plate 310. The second metal pattern 330 is electrically connected to the first metal pattern 320. For example, a hole A is formed in the reflecting plate 310, and the first metal pattern 320 and the second metal pattern 330 may be connected to each other through the hole A.

The second metal pattern 330 may be directly connected to a power supply unit. That is, power may be supplied from the power supply unit to the light source 400 through the second metal pattern 330 and the first metal pattern 320. In the related art, in order to connect a PCB and a power source, a connector should be used. In contrast, in the present disclosure having the aforementioned structure, a PCB is not necessary and there is no need to install a separate connector. Thus, cost and labor force incurred and required for a manufacturing process of the backlight unit 300 may be reduced A spacing member 250 may be disposed between the display panel 240 and the backlight unit 300 in order to maintain a space therebetween.

The display panel 240 may include a light guide plate, a diffusion sheet, a prism sheet, and the like.

The light guide plate guides movement of light such that light emitted from the light source 400 may be uniformly distributed to the entire display region.

The diffusion sheet is disposed on an upper surface of the light guide plate and formed to diffuse light passing through the light guide plate. Preset patterns for effectively diffusing light may be continuously formed on a surface of the diffusion sheet.

As the diffusion sheet diffuses light, light may be uniform, while brightness of light may be lowered. The prism sheet has a prism pattern to serve to refract and collect light emanated from the diffusion sheet to increase brightness of light.

A protective sheet protecting the prism sheet and spreading light having a viewing angle narrowed by the prism sheet may be disposed on an upper surface of the prism sheet.

Also, a sensor having an inter-layered structure with the display panel 240 may be further disposed.

When the display panel 240 and the sensor sensing a touch operation (hereinafter, referred to as a "touch sensor") has an inter-layered structure (hereinafter, referred to as a "touch screen"), the display unit may also be used as an input device, as well as as an output device. For example, the touch sensor may have a form of a touch film, a touch sheet, a touch pad, and the like.

The touch sensor may be configured to convert pressure applied to a particular portion of the display panel 240 or a change in capacitance, or the like generated at a particular portion of the display panel 240 into an electrical input signal. The touch sensor may be configured to detect pressure when a touch is applied, as well as a touched position and area.

When a touch input is applied to the touch sensor, a corresponding signal (signals) are transmitted to a touch controller. The touch controller processes the signals and subsequently transmits corresponding data to a controller. Accordingly, the controller may recognize which portion of the display panel 240 has been touched.

Figure 5:
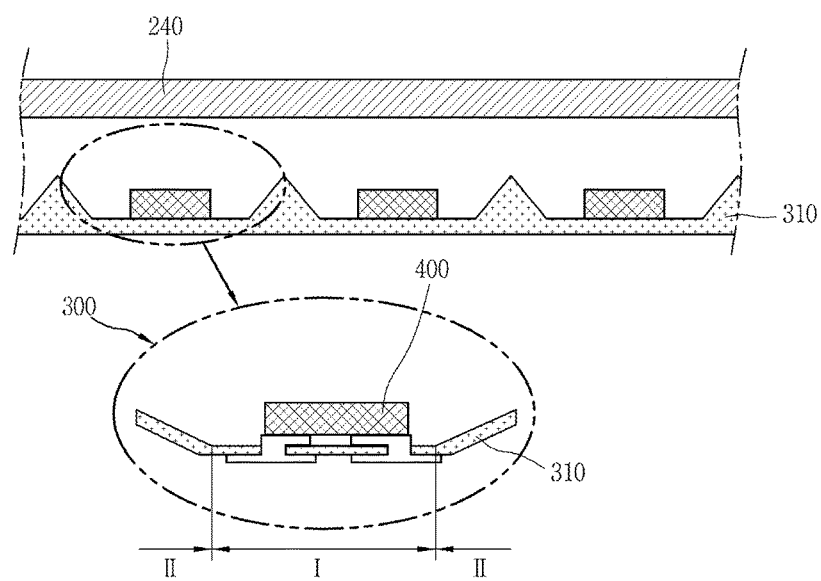
FIG. 5 is a conceptual view of a backlight unit according to another embodiment of the present disclosure.

FIG. 5 is a conceptual view of the backlight unit 300 according to another embodiment of the present disclosure.

Referring to FIG. 5, the backlight unit 300 includes the light source 400, the reflecting plate 310 on which the light source 400 is mounted, the first metal pattern 320 formed on one surface of the reflecting plate 310, and the second metal pattern 330 formed on the other surface of the reflecting plate 310.

In this embodiment, the reflecting plate 310 does not have a planar shape but is bent to have a specific shape to increase reflecting efficiency. For example, the reflecting plate 310 of this embodiment includes a first region I on which the light source 400 is seated and a second region II bent from one end of the first region and extending in a direction in which the light source 400 is seated. The second region II extends from the first region I to form an inclined plane to reduce leakage of light from light source 400 to a side surface. In other words, light moving in a lateral direction may be reflected by the second region II and irradiated to the display panel 240. Accordingly, efficiency of the light source 400 may be enhanced.

Figure 6A:
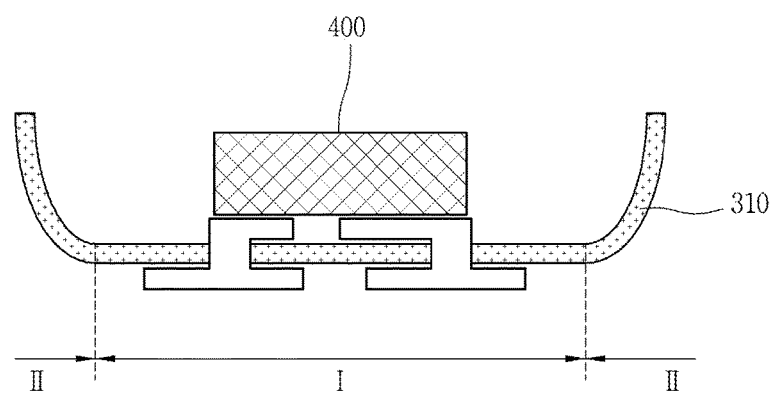
FIGS. 6A and 6B are conceptual views illustrating other embodiments of the reflecting plate illustrated in FIG. 4.
Figure 6B:
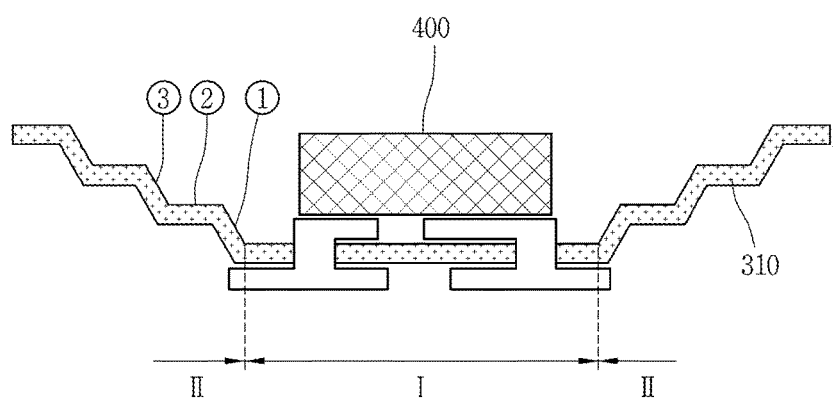

FIGS. 6A and 6B illustrate other embodiments related to a shape of the reflecting plate 310.

In FIG. 6A, the second region II of the reflecting plate 310 forms a curved surface. The light source 400 is seated on the first region I of the reflecting plate 310, and the second region II forms a curved surface bent toward the light source 400. For example, a cross-section of the curved surface may be manufactured to form a portion of a parabola in which the light source 400 is disposed at a focal point thereof. According to the embodiment, light emitted from the light source 400 may be incident to the display panel 240 vertically, enhancing efficiency of the light source 400.

In FIG. 6B, the second region II of the reflecting plate 310 may be bent several times to form a step shape. For example, the second region II may include a first part ① bent to extend from one end of the first region I, a second part ② bent to extend from one end of the first part ①, and a third part ③ bent to extend from one end of the second part ②, and here, each of the parts may be formed to have different tilts.

Also, in another embodiment, protrusions (not shown) irregularly protruding from a surface of the second region II may be formed on the surface of the second region II. The protrusions cause light irradiated from the light source 400 to be scattered-reflected.

Figure 7A:
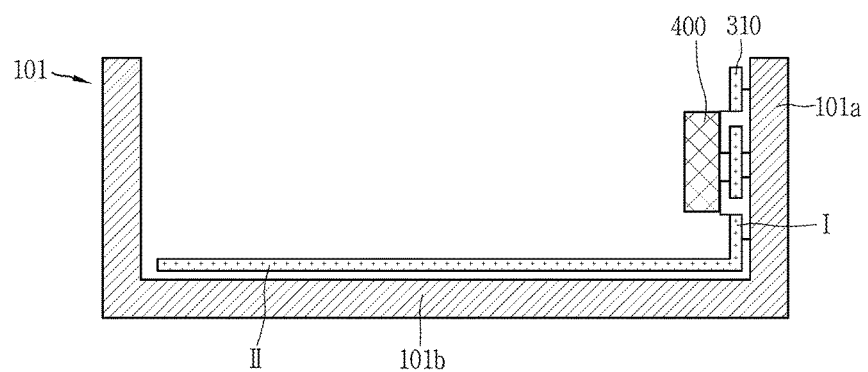
FIGS. 7A and 7B are views illustrating an embodiment of a display device in which a light source is formed on one surface thereof.

FIG. 7A is a view illustrating an embodiment of a display device in which a light source 400 is formed on one surface thereof.

Referring to FIG. 7A, a first region I of the reflecting plate 310 is disposed to overlap one surface 101a of a housing 101, and a second region II is disposed to overlap a rear surface 101b of the housing 101.

The first region I and the second region II are defined for the purposes of description. The first region I refers to a region on which the light source 400 is seated, and the second region II refers to a region extending from the first region I.

In this embodiment, an edge-type backlight unit 300 is illustrated. As illustrated, the light source 400 irradiates light toward the center of the display device from one surface. Light irradiated from the light source 400 is directly incident toward the display panel 240 or is reflected from the first region I and the second region II so as to be incident.

Figure 7B:
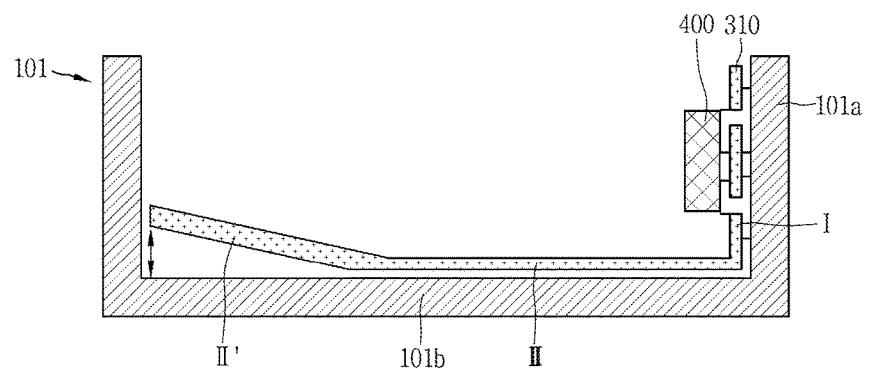

FIG. 7B illustrates another embodiment of a display device in which a light source 400 is disposed on one surface thereof.

Referring to FIG. 7B, the light source 400 is disposed to overlap one surface 101a of the housing 101 and irradiates light toward the center of the display device. A second region II is disposed to overlap a rear surface 101b of the housing 101, and one end portion II' of the second region II is formed to be spaced apart from the rear surface 101b. In other words, the second region II of the reflecting plate 310 is formed to be closer to the display panel 240 as it is distant from the one surface 101a on which the light source 400 is disposed. Through this structure, a phenomenon in which difference in brightness between both sides of the display may be reduced.

Figure 8A:
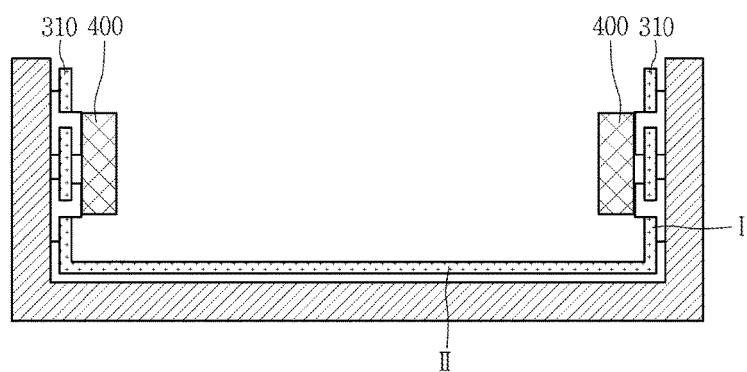
FIGS. 8A and 8B are views illustrating an embodiment of a display device in which a light source is formed on both surfaces thereof.

FIG. 8A is a view illustrating an embodiment of a display device in which light sources 400 are formed on both surfaces of the housing 101.

Also, in this embodiment, the edge type backlight unit 300 is illustrated. In this embodiment, the light sources 400 are disposed on both surfaces of the housing 101 to prevent occurrence of a difference in brightness between both sides of the display.

Referring to FIG. 8A, the light sources 400 are seated on end portions of both sides of the reflecting plate 310. In other words, a first region I on which the light source 400 is seated is provided, a second region II is formed to extend from one end of the first region I, and a third region III on which the light source 400 is seated is further provided at one end of the second region II.

The aforementioned regions are classified for the purposes of description, and in this embodiment, the regions are classified to describe disposition of the light sources 400 at both end portions of the reflecting plate 310.

As illustrated, the reflecting plate 310 may be disposed to cover an inner surface of the housing 101 to prevent leakage of light emitted from the light source 400 to the side.

Figure 8B:
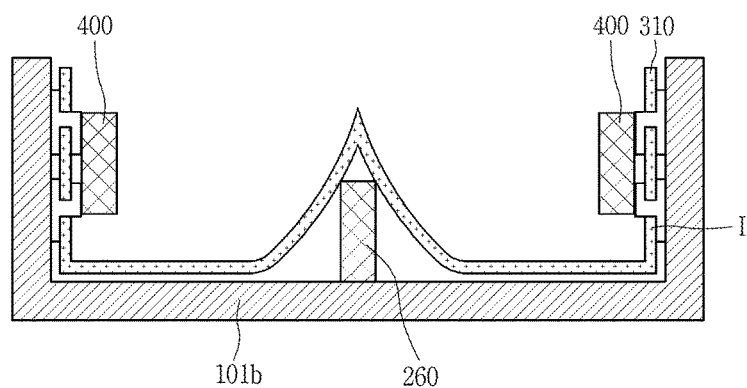

FIG. 8B is a view illustrating another embodiment of a display device in which light sources 400 are disposed on both surfaces of the housing 101.

Referring to FIG. 8B, the second region II extending from the first region I is formed to be spaced apart from a rear surface 101b of the housing 101. In other words, the reflecting plate 310 may be formed such that the center thereof protrudes. In order to maintain such a configuration, a support member 260 may be disposed between the housing 101 and the reflecting plate 310.

In the aforementioned embodiments, it is described that the housing 101 and the reflecting plate 310 overlap each other. This includes a case in which other members are disposed between the housing 101 and the reflecting plate, as well as a case in which the housing 101 and the reflecting plate 310 are in contact with each other. For example, in the aforementioned embodiments, the housing 101 may be replaced by a frame for fixing the backlight unit 300.

Figure 9:
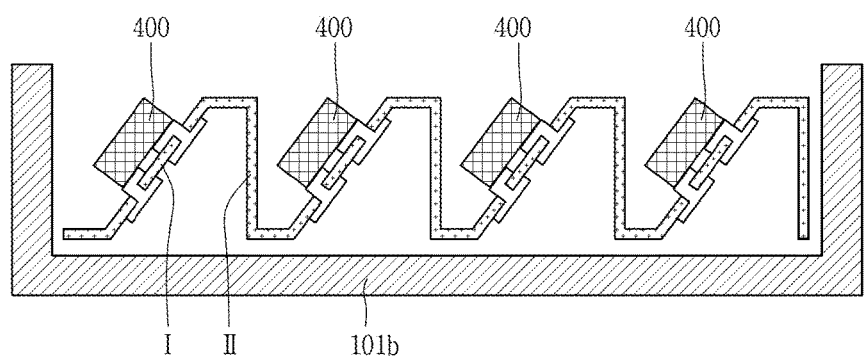
FIG. 9 is a view illustrating an embodiment of a display device to which a plurality of light sources are applied.

FIG. 9 is a view illustrating an embodiment of a display device to which a plurality of light sources 400 are applied.

Referring to FIG. 9, the reflecting plate 310 includes a first region I having a predetermined slope and a second region II extending from one end of the first region I toward the rear surface 101b of the housing 101. The first region I and the second region II are repeatedly formed at a predetermined interval. For example, as illustrated, the reflecting plate 310 may be disposed to have a serrate shape, and the light sources 400 are installed at a predetermined interval. Fixing members may be provided to be disposed at a predetermined interval between the reflecting plate 310 and the housing 101.

The second region II may be formed to be sloped in a direction opposite to that of the first region I. Light irradiated from the light source installed in the first region is reflected by the second region II and incident to the display panel 240.

As described above, in the backlight unit related to at least one embodiment of the present disclosure, since the reflecting plate replacing a PCB is used, a thickness of the backlight unit may be significantly reduced, compared with an existing backlight unit. Thus, an internal space of a display device may be effectively utilized and the display device may be made slimmer.

Also, according to the structure of the present disclosure, since there is no need to attach the reflecting plate to a PCB, a manufacturing process of the backlight may be simplified and material cost may be reduced.

In addition, in the present disclosure, since the light source is in contact with the reflecting plate and the reflecting plate is bent to effectively reflect light, an amount of light leaked to the outside of a device may be reduced and efficiency of the device may be maximized.

As for the backlight unit and the display device according to the present disclosure, the configuration and method according to the embodiments of the present disclosure described above are not limited in its application, but the entirety or a portion of the embodiments may be selectively combined to be configured into various modifications.

The invention claimed is:

1. A display device comprising:
a housing;
a display panel mounted on one surface of the housing and configured to display an image; and
a backlight unit installed within the housing and configured to project light onto the display panel,
wherein the backlight unit comprises:
a reflecting plate on which a light source is seated;
a first metal pattern formed on one surface of the reflecting plate, the first metal pattern being electrically connected to the light source; and
a second metal pattern formed on the other surface of the reflecting plate, the second metal pattern being electrically connected to the first metal pattern and a power supply unit,
wherein the reflecting plate is formed of a Microcellular PET (foamed polyethylene terephthalate) material and has foams of micrometer size ranging from 0.1 to 10 µm,
wherein the reflecting plate includes:
a first region on which the light source is mounted;
a second region bent to extend from one end of the first region; and
a third region bent to extend from one end of the second region and having another light source seated thereon,
wherein the first region is attached to overlap one surface of the housing, and the second region overlaps a rear surface of the housing,
wherein the one surface of the housing is bent to extend from the rear surface of the housing,
wherein:
the first region is disposed to overlap one surface of the housing,
the second region is disposed to overlap a rear surface of the housing and is spaced apart from the rear surface, and
the third region is disposed to overlap the other surface of the housing,
a central portion of the second region protrudes and a support member is disposed between the housing and the reflecting plate at the central portion of the second region.

2. The backlight unit of claim 1, wherein a light guide plate is disposed between the reflecting plate and the display panel.

* * * * *